March 7, 1939.  G. S. KELLEY  2,149,348
DUST COLLECTING DEVICE
Filed June 7, 1937
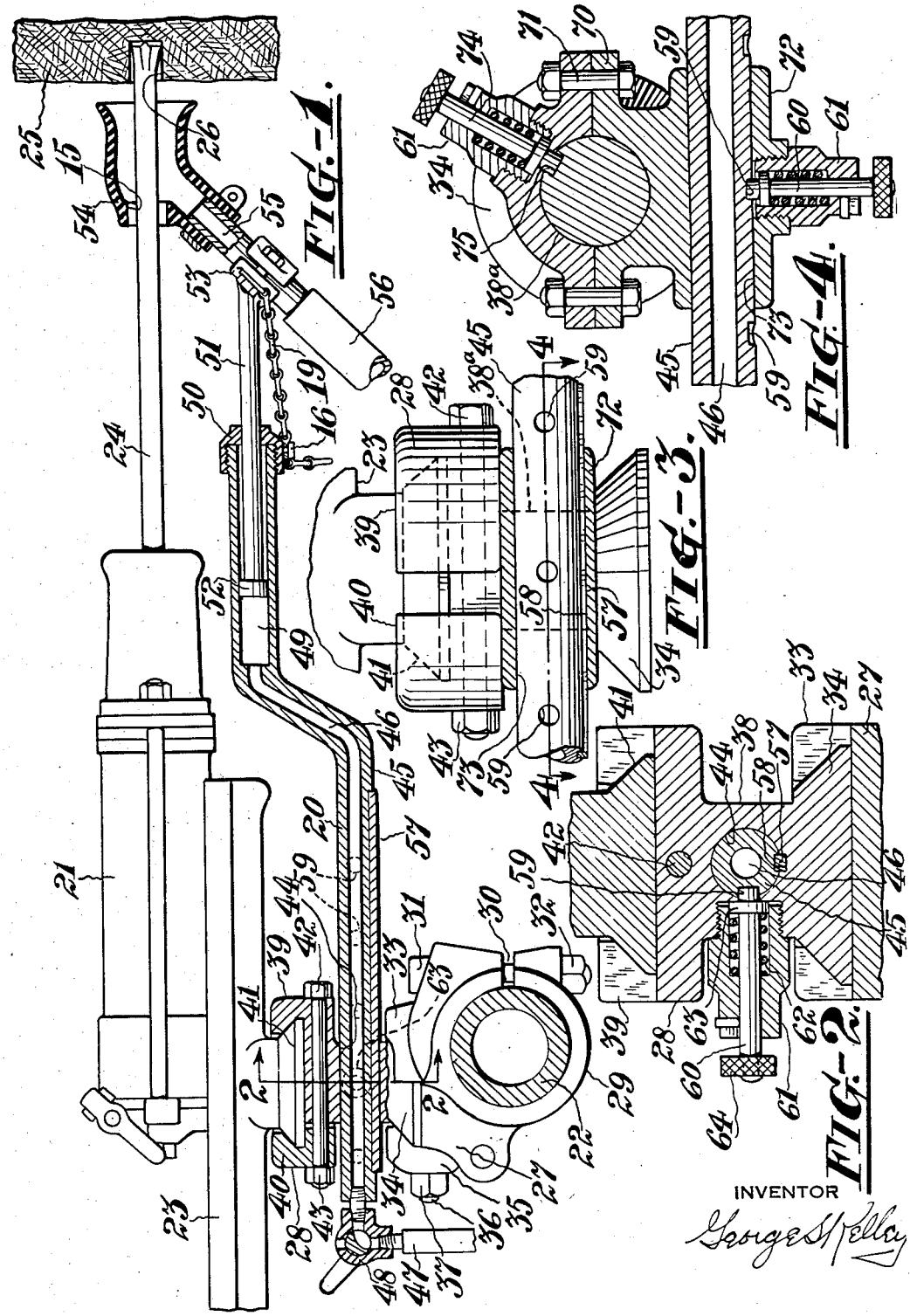
INVENTOR
George S. Kelley Patented Mar. 7, 1939

2,149,348

UNITED STATES PATENT OFFICE 2,149,348

DUST COLLECTING DEVICE

George S. Kelley, Mount Vernon, N. Y., assignor to The Kadco Corporation, New York, N. Y., a corporation of New York Application June 7, 1937, Serial No. 146,730

10 Claims. (Cl. 255—50)

This invention relates to dust collecting devices, and more particularly to a dust collecting device adapted for use with rock drilling mechanism comprising a shell or cradle to support and guide the rock drill with respect to the work.

The elements comprising the drilling mechanism may be of well known types and, as is customary, the shell carries a cone which is gripped by a clamping device serving to secure the shell to a supporting bar. The clamping device is movable longitudinally of the bar and, in accordance with the practice of the invention, supports a collector which overlies the mouth of the hole being drilled to prevent the dissemination of dust in the atmosphere. Thus, as will be readily appreciated, the collector, being shiftable with the drilling mechanism, will at all times occupy substantially the correct operative relationship with respect to the rock drill.

It is an object of the invention to enable the dust collector to be easily and expeditiously placed over the source of dust.

Other objects will be in part obvious and in part pointed out hereinafter.

In the accompanying drawing illustrating the invention and in which similar reference numerals refer to similar parts, Figure 1 is a longitudinal view, partly broken away, of a dust collecting device constructed in accordance with the practice of the invention and a side view of a rock drill and a shell to which the dust collecting device is applied.

Figure 2 is a transverse view taken through Figure 1 on the line 2—2,

Figure 3 is a view, partly in section, of a modified form of the invention, and

Figure 4 is a plan view, in section, taken through Figure 3 on the line 4—4.

Referring more particularly to the drawing, 20 designates, in general, the dust collecting device, 21 a rock drill and 22 a bar which supports the rock drill and the dust collecting device.

The rock drill 20 is of the drifter type. It is supported by a shell 23 whereon it is slidable to assure a correct operative relationship between the rock drill and a working implement 24 which the rock drill is intended to actuate into the rock 25 for drilling a hole 26. The working implement is hollow throughout and it is to be understood that pressure fluid is conveyed thereby into the drill hole to blow the cuttings therefrom.

The means employed for securing the shell 23 to the bar 22 consists of a pair of clamping devices 27 and 28 which are clamped together and, respectively, to the bar and the shell. The clamping device 27 may be of a type frequently employed in conjunction with apparatus of the character illustrated. It comprises a cylindrical clamp 29 which encircles the bar 22 and is split, having a gap 30 in one side to enable it to be contracted into firm gripping engagement with the bar. The force required for this purpose may be conveniently applied by means of a bolt 31 and a nut 32 acting upon the portions of the clamp lying on opposite sides of the gap 30.

The clamping device 27 supports the clamping device 28 and has an integral jaw 33 which is recessed to receive a cone 34 of the clamping device 28. A complemental jaw 35 cooperates with the jaw 33 to grip the cone 34 and is slidable on a bolt 36 in the clamping device 28. A nut 37 on the bolt 36 acts against the jaw 35 for pressing it into engagement with the cone 34.

In addition to the cone 34, the clamping device 28, constructed in accordance with the practice of the invention, comprises a neck 38 having a jaw portion 39 which cooperates with a movable jaw 40 to grip a cone 41 on the shell 23. The jaws 39 and 40 are clamped to the cone 41 by a bolt 42, upon which the jaw 40 is slidable, and a nut 43 seating against the movable jaw 40.

In the form of the invention illustrated in Figures 1 and 2 the neck 38 is provided with a transverse bore 44 to slidably receive a column 45 of the dust collecting device 20. The column 45 is hollow throughout. The interior thereof constitutes a passage 46 which is connected with a source of pressure fluid supply through a conduit 47 connected to an end of the column, and the flow of pressure fluid into and from the column is controlled by a valve 48 interposed in the conduit 47.

In its operative position the column 45 is arranged in parallelism with the rock drill 21. The end of the column confronting the rock 25 is offset with respect to the portion engaging the neck 38 and is bored to form a piston chamber 49 of which the innermost end is in direct communication with the passage 46. A cap 50 threaded on the rod forms a closure for the piston chamber 49 and acts as a guide for a rod 51 carried by a piston 52 reciprocable and freely rotatable in the piston chamber 49.

On the free end of the rod 51 is a clamp 53 to grip and support a dust collecting hood 54 into which the dust passes from the hole being drilled. The hood 54 encircles the drill steel and is pressed toward the rock 25 by the pressure fluid acting against the piston 52. The hood may be constructed of rubber or like flexible material and has an outlet opening 55 through which the cuttings pass into a conduit 56 leading to a suitable evacuator, as for example a blower (not shown).

In the end of the hood confronting the rock drill is an aperture 15 to accommodate the working implement 24 and this aperture is of somewhat larger diameter than the portion of maximum diameter of the working implement in order to allow the free entry of atmospheric air into the hood at this point.

The piston chamber 49 is preferably of considerable length so that the piston and, therefore, the hood 54 will be capable of a wide range of movement to compensate for variations in distance between the bar 22 and the face of the rock intended to be drilled. Under certain conditions, as when drilling a hole into a surface inclined with respect to the drilling apparatus, the hood may be brought into contacting relation with the work. Normally, however, it is positioned in such wise that a space exists between the work and the hood so that atmospheric air may enter freely into the front end of the hood, as well as through the aperture 15.

The collecting device is accordingly provided with an adjusting stop member, as for example a chain 19 connected to the cap 50 and the clamp 53, to definitely limit the outward movement of the piston 52. An end of the chain may be permanently secured to the clamp 53 and its opposite end, or the intermediate links, may be removably attached to a pin 16 on the cap 50 to extend or shorten the active portion of the chain as required to place the hood in the correct operative position with respect to the work. Thus, under normal drilling conditions and assuming the bar 22 to be so positioned that maximum extension of the column 45 is not necessary to bring the hood into proximity with the work, an intermediate link of the chain is attached to the pin 16. And in the event that the working implement traverses a subterranean stream or pocket of water the chain may be further shortened to remove the hood in order to avoid the entrance of water thereinto.

Further adjustment of the dust collecting device may be made by shifting the column 45 relatively to the bar 22. The column is freely slidable in the neck 38 and may, therefore, be readily moved toward or away from the work to assure a favorable position of the piston 52 in the piston chamber 49.

The column is preferably held against rotary movement as by means of a key 57 imbedded in the column and slidably engaging a slot 58 in the neck 38 to maintain the offset portion of the column in close proximity to the rock drill and thereby minimize the distance between the clamp 53 and the hood 54. To the end that the column may be securely locked to the neck 38, a series of depressions 59 are formed in the periphery of and spaced along the length of the column to receive the end of a plunger 60 supported by the neck.

As a preferred arrangement, the plunger 60 is disposed within a bushing 61 threaded into the neck 38, and a spring 62 in the bushing acts against a collar 63 on the plunger to urge the plunger toward the column. The plunger extends exteriorly of the bushing and carries a grip member 64 whereby it may be manipulated.

The operation of the device is as follows: After the rock drill has been correctly positioned with respect to the work and the column 45 arranged in parallelism therewith the clamping devices 27 and 28 are brought into firm gripping engagement with the cones 34 and 41 to effect a rigid connection between the shell and the bar 22. The hood 54 is then placed in position near the rock, in alignment with the rock drill and the chain 19 is adjusted to preclude outward movement of the hood beyond the desired position. The valve 48 may then be opened and the pressure fluid thus admitted into the piston chamber 49 will act against the piston 52 and maintain the chain taut and hold the hood immovable to receive the dust created by the working implement.

Shortly prior to or coincident with the starting of the drilling apparatus the evacuating element is set in operation and a sub-atmospheric pressure is maintained thereby in the hood 54 and in the drill hole. Under this condition the velocity of the air issuing from the drill hole is highly accelerated and its dust carrying capacity is, therefore, greatly increased. As a result, the cuttings are removed as rapidly as formed, the working implement will constantly operate upon a clean working surface instead of a cushioning layer of detritus, and the full force of the percussive element will be expended against unbroken rock so that the rate of drilling will be materially increased. Moreover, by reason of the fact that large volumes of atmospheric air flow into the hood through its front end and the aperture 15 any dust which may be disturbed or raised through the movements of the operator, or otherwise, will also pass into the hood and thus be removed from the vicinity of the drill hole so that the operator may work in a substantially dust-free atmosphere.

Whenever a working implement has penetrated the rock to the limit of its extent and it is desired to substitute one of greater length, the change may be conveniently effected by merely manipulating the clamping device 28 and without disturbing the clamping device 27 and the dust collecting elements, as will be apparent. In the event that it should become necessary to shift the column the plunger is retracted. The column may then be moved toward or from the work, as required. When the column has been placed in approximately the correct position the plunger may be released to seat against the side of the column. Further slight shifting of the column, if necessary, will bring a depression 59 into alignment with the plunger which will then be moved into locking position by the spring 62.

After a drill hole has been completed and the working implement removed therefrom, the valve 48 is manipulated to exhaust the pressure fluid from the piston chamber 49. The hood may then be removed from its collecting position. Thereafter, the clamp 29 is loosened and the drilling and dust collecting apparatuses may be shifted along the bar, as a unit, to a new position and without necessitating any changes in the relative positions of the rock drill and the column 54 and associated parts.

In the form of the invention illustrated in Figures 3 and 4 a collar 70 is disposed about the neck 38ª to support the column 45. The collar is rotatable about the neck and consists of two half sections which are secured together by bolts 71. One of the collar sections carries a boss 72 having a bore 73 to receive the column which, as in the form of the invention previously described, is slidable relatively to the clamping device and locked in position by the plunger 60 carried by the boss 72. In the other collar section is a plunger 74, preferably a replica of the plunger 60, to seat into a socket 75 in the side of the neck 38a to lock the collar to the clamping device.

In the practice of this form of the invention the plunger 74 is placed in the socket 75 and the clamping device 28 is manipulated to place the dust collecting hood over the source of dust. The clamping device 27 is then clamped to the cone 34 to assure the retention of the dust collecting device in the correct operative position and to establish a rigid connection between the shell 23 and the bar 22. Whenever it is desired to remove the hood from the collecting position the plunger is withdrawn from the socket 75 and the dust collecting device may then be rocked about the neck 38a to expose the drill hole.

I claim:

1. In a dust collecting device, the combination of a rock drill and a mounting for the rock drill, a clamping device for securing the rock drill to the mounting, a dust collecting hood, support means for the hood, a bearing in the clamping device for the support means, and means for locking the support means to the clamping device.

2. In a dust collecting device, the combination of a rock drill and a mounting for the rock drill, a dust collecting hood, pressure fluid actuated extensible means to support the head, means to support the extensible means and being slidably interlocked with the mounting, and means for locking the last said means to the mounting.

3. In a dust collecting device, the combination of a rock drill and a mounting for the rock drill, a clamping device for securing the rock drill to the mounting, a dust collecting hood, a cylinder slidable in the clamping device, means for locking the cylinder to the clamping device, a fluid actuated piston in the cylinder having a rod to support the hood, and means for subjecting the piston to pressure fluid to press the hood over a source of dust.

4. In a dust collecting device, the combination of a rock drill and a guide shell therefor, a support device for the shell, a dust collecting hood, pressure fluid extensible means to support the hood, means to support the pressure fluid extensible means and being slidable in the support device, and means for locking the last said means to the support device.

5. In a dust collecting device, the combination of a guide shell and a rock drill on one side of the guide shell and slidable thereon, a mounting on the other side of the guide shell to support the guide shell and the rock drill, a dust collecting hood, means slidable in the mounting to support the hood, and means for locking the first said means to the mounting.

6. In a dust collecting device, the combination of a rock drill and a mounting therefor, a clamping device to secure the rock drill to the mounting, a dust collecting hood, a cylinder supported by the clamping device and being adjustable in step-by-step fashion longitudinally of the rock drill, and a pressure fluid actuated plunger in the cylinder to support the hood.

7. In a dust collecting device, the combination of a rock drill and a mounting for the rock drill, a clamping device to secure the rock drill to the mounting, a dust collecting hood, a cylinder supported by the clamping device and being adjustable in step-by-step fashion longitudinally of the rock drill, and a pressure fluid actuated plunger in the cylinder to support the hood and having a range of movement in excess of the steps of adjustment of the cylinder.

8. In a dust collecting device, the combination of a rock drill and a mounting therefor, a dust collecting hood, a cylinder slidably interlocked with the mounting and having a series of sockets spaced longitudinally thereof, means to engage the sockets for locking the cylinder to the mounting, and a pressure fluid actuated plunger in the cylinder to support the hood.

9. In a dust collecting device, the combination of a rock drill and a guide shell therefor, a clamping device to grip the shell, a dust collecting hood, and means pivotally mounted on the clamping device to support the hood.

10. In a dust collecting device, the combination of a rock drill and a guide shell therefor, a clamping device to grip the shell, a dust collecting hood, a bearing pivotally mounted on the clamping device, pressure fluid extensible means to support the hood, and an extension on the extensible means slidable in the bearing.

GEORGE S. KELLEY.